H. P. MINOT.
Ore-Separator.
No. 6,538. Reissued July 13, 1875.
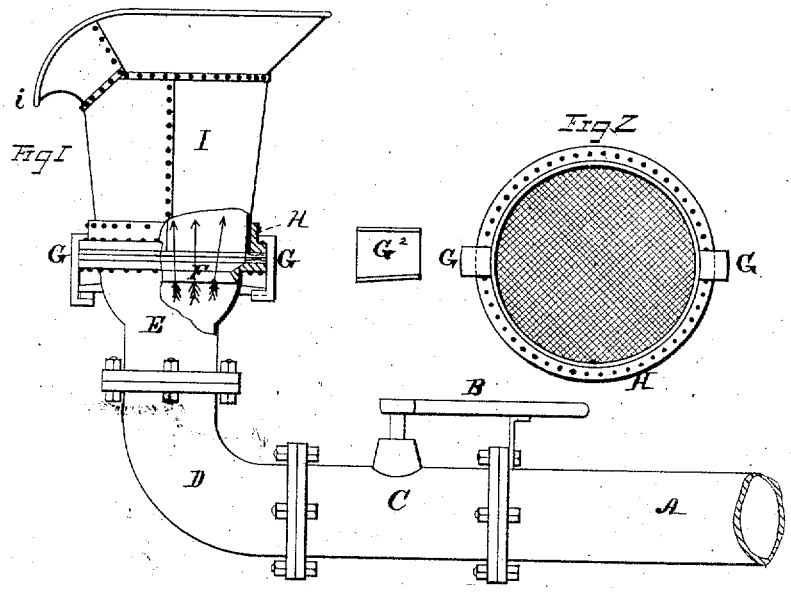
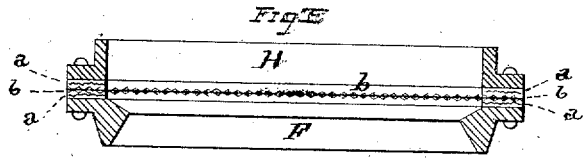
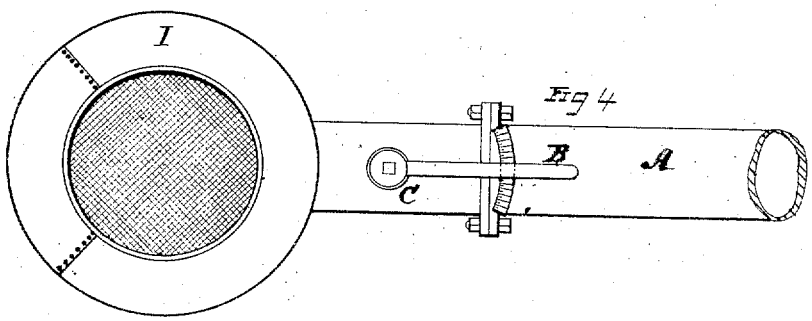
WITNESSES
Walter Miller
William Ewart
INVENTOR
Hiram P. Minot
By Leggett & Leggett
Attorneys

UNITED STATES PATENT OFFICE.

HIRAM P. MINOT, OF CHICAGO, ILLINOIS, ASSIGNOR, BY MESNE ASSIGNMENTS, TO F. A. BOWEN, OF SAME PLACE.

IMPROVEMENT IN ORE-SEPARATORS.

Specification forming part of Letters Patent No. 145,441, dated December 9, 1873; reissue No. 6,538, dated July 13, 1875; application filed April 17, 1875.

*To all whom it may concern:*

Be it known that I, HIRAM P. MINOT, of Chicago, Cook county, State of Illinois, have invented a Separator; and declare the following to be such a full, clear, and exact description thereof as will enable others skilled in the art to which my invention relates to make and use it, reference being had to the accompanying drawings, which form a part of this specification.

My invention relates to that class of separators designed to separate granular substances of different specific gravity, and is accomplished by agitating the granular mass by water or other fluid made to pass through the body of the said granular mass while the said mass is inclosed in a suitable receptacle, as hereinafter more fully set forth and claimed.

In the drawings is presented one form of apparatus for carrying out the object of the invention, in which Figure 1 is a side elevation, showing parts in section. Fig. 2 is a separate view in plan of the screen. Fig. 3 is a sectional view of the said screen, showing its mode of attachment. Fig. 4 is a plan view of a device embodying my invention.

A is a tube, of sufficient size, through which fluid is fed to a receptacle containing the granular mass. B is a handle controlling the valve, whereby fluid is fed in any suitable quantities, or with any desired rapidity. C is a casing containing the said valve. D is an elbow, whereby the current is given an upward course into the enlargement E, whereby the fluid is made to enter the receptacle containing the granular mass through the whole surface of a screen or perforated partition, *b*. Resting on the edge of this enlargement E is a flange, F, which sits into the enlargement E as far as the shoulder. H is also a flange. A A is packing placed between the flange H and the flange F, and the two flanges are firmly bound together in any suitable manner, thereby securely fastening the screen or perforated surface *b*. The hopper or receptacle I is fastened to the flange H, and gradually increases in size until it reaches the overflow *i*. The hopper I, with the flanges H and F and the wire screen or perforated bottom D, are secured or adjusted to the enlargement E by means of the lugs G G, or an incline passing under a binding-pin, the pin fastened in the side of the enlargement or bowl E.

The tube, casing, valve, elbow, perforated surface, and tapering hopper being provided, substantially as above described, the hopper being sufficiently filled with the granular substances to be separated, and the tube A being connected by any suitable means with a fluid-supply, the valve C is opened, the fluid flows through the tube, the perforated surface, the mixture to be separated, and escapes at the overflow *i*, as indicated by the arrows.

By means of the valve and the tapering hopper or receptacle the speed of the water or fluid is caused to decrease as it reaches the overflow, and is so regulated that as the fluid passes through the receptacle containing the granular mass to be separated, it lifts and subjects to a lively agitation the said granular mass, allowing the lighter parts to escape at the overflow, while the heavier portions remain in the hopper or receptacle, and in this way separates the heavier matter from the lighter. When the mass is sufficiently agitated and the separation effected, the current of fluid is stopped by the valve and the contents remaining in the receptacle removed.

It is evident that various devices may be employed for effecting the separation without departing from the principle of my invention; the object of my invention being to effect the separation of granular substances of different specific gravity by first confining the substances within a suitable receptacle provided with a perforated surface, through which fluid is forced in such a manner as to effect a lifting and thorough agitation of the granular mass, and provided with an escape or overflow from the said receptacle for the surplus liquid and the lighter substances that are separated from the mass; also, the provision of a receptacle or hopper of tapering form, whereby the water that enters it through a diminished perforated screen or surface will expend to a great degree its agitating powers before it reaches the overflow, and will therefore carry over only the lighter portions of the granular mass.

What I claim as new is—

1. A separator for separating granular substances of different specific gravity by fluid agitation, consisting of a hopper or receptacle for receiving the granular substances to be separated, an overflow from the said hopper or receptacle, a perforated screen or surface, through which fluid can enter the hopper to agitate the mass, a fluid-supply pipe, and valve for regulating the supply of fluid, substantially as and for the purpose described.

2. In a separator designed for separating granular substances of different specific gravity by fluid agitation, the screen or perforated surface *b*, connecting directly with a tapering hopper or receptacle, I, and overflow *i*, substantially as and for the purpose described.

3. In a separator for separating granular substances of different specific gravity by the action of a current of fluid flowing in a direction contrary to the gravity of the particles, a hopper or receptacle for holding the substances while being acted upon, provided with the overflow *b*, as described, and of a form substantially as described, whereby the velocity of the fluid required to agitate the granular particles at its entrance is gradually reduced in force to that necessary for the removal of particles of lighter specific gravity, substantially as and for the purpose described.

In testimony whereof I have hereunto signed my name this 29th day of March, A. D. 1875.

HIRAM P. MINOT.

Witnesses:

O. B. MATTESON,

L. M. THOMSON.